E. W. RICE, Jr.
ELECTRIC SOLDERING IRON.
APPLICATION FILED OCT. 7, 1909.
957,256.
Patented May 10, 1910.
Fig. 1.
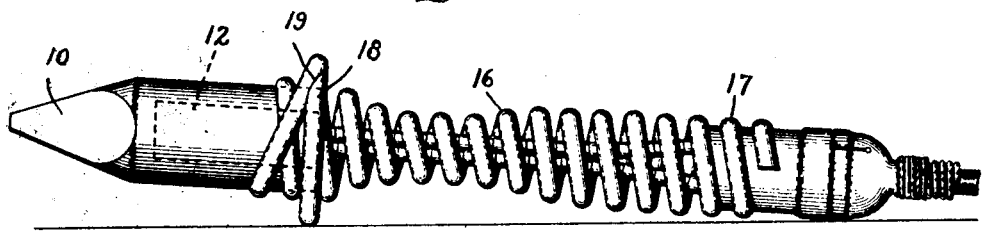
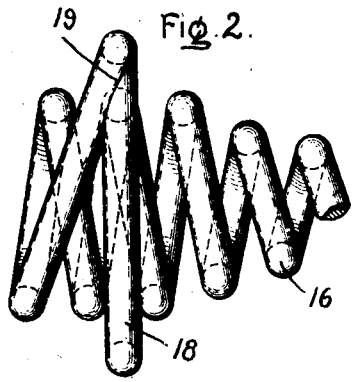
Fig. 2.
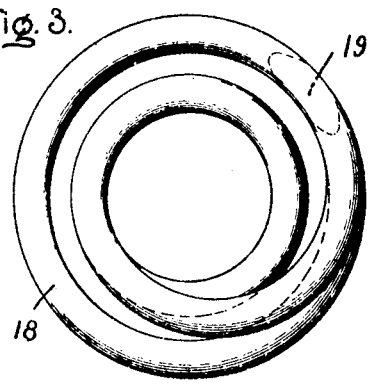
Fig. 3.
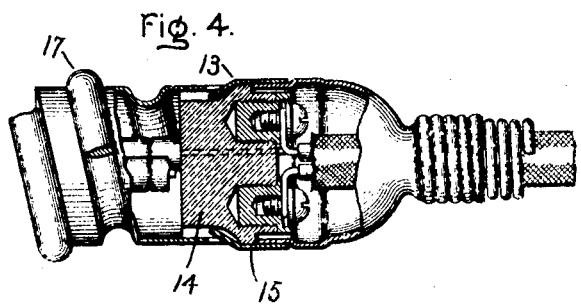
Fig. 4.
Witnesses:
J. Ellis Glen
J. Earl Ryan
Inventor:
Edwin W. Rice. Jr.
by Albert G. Davis
His Attorney.

UNITED STATES PATENT OFFICE.

EDWIN W. RICE, JR., OF SCHENECTADY, NEW YORK, ASSIGNOR TO GENERAL ELECTRIC COMPANY, A CORPORATION OF NEW YORK.

ELECTRIC SOLDERING-IRON.

957,256.　　　　　　Specification of Letters Patent.　　Patented May 10, 1910.

Application filed October 7, 1909. Serial No. 521,568.

*To all whom it may concern:*

Be it known that I, EDWIN W. RICE, Jr., a citizen of the United States, residing at Schenectady, in the county of Schenectady, State of New York, have invented certain new and useful Improvements in Electric Soldering-Irons, of which the following is a specification.

This invention relates to electrically heated tools and has for its object the provision of a device of this character which is extremely simple in construction and which can be brought up to a working temperature rapidly and efficiently.

My invention relates more particularly to such tools as soldering irons and the like, in which a tip or point of metal is brought up to a definite temperature.

One of the objects of my invention is to so construct the soldering iron that the tip may be readily supported out of contact with the table or bench upon which it is resting.

In carrying out my invention, I equip the soldering iron with a flexible handle made in the form of a coiled spring and enlarge the spring at a point near the tip, so as to form a support for the iron. I also secure a terminal supporting member at the opposite end of the spring handle, so as to facilitate the making of connections to the electric circuit.

Other objects and purposes of my invention will appear in the course of the following specification, in which I have shown my invention embodied in concrete form for purposes of illustration.

Referring to the drawings, Figure 1 is a view of my complete soldering iron; Figs. 2 and 3 are views of the spring handle, and Fig. 4 represents a detail of the attaching member.

Referring to the drawings, 10 represents a soldering tip made of any suitable material, as for instance, copper. This tip is pointed in the usual way and is heated by means of a heating unit 12. This heating unit may be of the cartridge unit type, such as is disclosed in the patent to Stevens, No. 803,795. Any desired form of heating unit may, however, be employed without departing from the spirit of my invention. The terminals from this heating unit are brought out and secured to the terminal attaching member 13, consisting of an insulating block 14, to which the terminals are connected and inclosed in a metallic casing 15. The handle for the soldering iron consists of a coiled spring 16 having one end wound upon the attaching member at 17, while the opposite end is wound upon the tip 10.

In order to support the tip out of contact with the table or bench upon which it rests and keep it from burning the same, I have formed a support for the end of the iron. This support consists of a coil 18 of the spring 16, which is larger in diameter than the remainder of the handle. In forming this support, the wire is wound to form the handle proper, and the end which engages the tip 12 is then wound back to form the large coil 18. The end of the wire is then soldered to the enlarged coil at 19. This makes a very simple and rigid construction. By this means, in addition to the ventilated handle which is extremely rugged, a support is formed which will be practically out of thermal relation with the soldering tip and will, therefore, not get hot and burn the table upon which it rests.

It will be seen that I have produced a very simple and efficient soldering iron, which lends itself very readily to the making of electrical connections, and which can be laid down anywhere without danger of setting fire to the surroundings.

While I have described my invention as embodied in concrete structure for purposes of illustration, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is—

1. An electric soldering iron comprising an electrically heated soldering tip, a handle therefor having conducting terminals extending therethrough, and an enlarged portion adjacent the tip for supporting it above the resting surface.

2. An electric soldering iron comprising an electrically heated soldering tip, a handle therefor composed of an elongated coiled spring, and an enlarged portion upon the handle for supporting the tip above the resting surface.

3. An electric soldering iron comprising an electrically heated soldering tip and a handle therefor composed of an elongated coiled spring having one end wound upon the tip, and a supporting portion larger than said end portion.

4. An electric soldering iron comprising an electrically heated soldering tip and a handle therefor composed of an elongated coiled spring having one end wound upon the tip, and a supporting coil adjacent the tip larger than the remainder of the handle.

5. An electric soldering iron comprising an electrically heated soldering tip, a handle therefor composed of an elongated coiled spring having one end wound upon the tip, and a terminal attaching member secured to the opposite end of the spring.

6. An electric soldering iron comprising an electrically heated soldering tip, a handle therefor composed of an elongated coiled spring having one end wound upon the tip and a terminal attaching member screwed into the opposite end of the spring.

7. An electric soldering iron, comprising an electrically heated soldering tip, a terminal attaching member and a handle composed of an elongated coiled spring having one end wound upon the tip and the other upon the attaching member, said spring having an enlargement adjacent the tip for supporting the iron.

In witness whereof, I have hereunto set my hand this 6th day of October, 1909.

EDWIN W. RICE, Jr.

Witnesses:
BENJAMIN B. HULL,
HELEN ORFORD.